Oct. 30, 1962 R. A. STEARN Re. 25,276

TRAILER BOAT HOIST

Original Filed Jan. 4, 1956 6 Sheets-Sheet 1

Oct. 30, 1962 R. A. STEARN Re. 25,276

TRAILER BOAT HOIST

Original Filed Jan. 4, 1956 6 Sheets-Sheet 2

INVENTOR.
Richard A. Stearn
BY
Wiegand & Stone
Attys.

Oct. 30, 1962 R. A. STEARN Re. 25,276

TRAILER BOAT HOIST

Original Filed Jan. 4, 1956 6 Sheets-Sheet 3

INVENTOR.
Richard A. Stearn
BY
Wiguer & Stone
Attys.

TRAILER BOAT HOIST

Original Filed Jan. 4, 1956 6 Sheets-Sheet 4

INVENTOR.
Richard A. Stearn
BY
Wilfred S. Stone
Atty.

TRAILER BOAT HOIST

Original Filed Jan. 4, 1956 6 Sheets-Sheet 5

INVENTOR.
Richard A. Stearn
BY
Wingate S. Stone
Atty.

TRAILER BOAT HOIST

Original Filed Jan. 4, 1956 6 Sheets-Sheet 6

INVENTOR.
Richard A. Stearn
BY
Wingus S. Stone
Atty.

United States Patent Office

Re. 25,276
Reissued Oct. 30, 1962

25,276
TRAILER BOAT HOIST

Richard A. Stearn, Sturgeon Bay, Wis., assignor, by mesne assignments, to Drott Manufacturing Corporation, Milwaukee, Wis., a corporation of Wisconsin Original No. 2,889,062, dated June 2, 1959, Ser. No. 557,371, Jan. 4, 1956. Application for reissue May 24, 1961, Ser. No. 116,233
5 Claims. (Cl. 214—396)

Matter enclosed in heavy brackets [ ] appears in the original patent but forms no part of this reissue specification; matter printed in italics indicates the additions made by reissue.

This invention relates to a boat hoist, and more particularly to what the applicant terms a trailer boat hoist.

A boat hoist is a vehicle which can raise a boat out of water and carry it to some place on land where it may be stored or its hull worked upon. The boat hoist that applicant is particularly interested in is one for moving boats of 50 tons or less, more especially for boats in the 10-ton class. Trailer boat hoists with which the applicant is acquainted consist of an elongated, parallelepiped frame having no cross bar at the lower rear end. They may be 50 feet long and 20 feet wide. Mounted on wheels, a boat hoist can be backed over a slip, that is, along the facing edges of two wharves spaced by a few feet from each other. Two slings, one forward and one toward the rear, are suspended from the frame. These are lowered into the water in the slip by cables unreeled from drums on the frame. A motorboat, or sailboat with mast and rigging removed, is drawn inside the frame over the slings. These are then raised and they lift the boat upwardly into the frame. The boat hoist is then towed to some point in the yard.

These boat hoist frames are cumbersome and the slings are not readily adjustable to the length of a boat. Boats at Great Lakes' yacht clubs range from 10 to 75 feet in length, and it is desirable to provide a boat hoist of considerable range in weight capacity and length capacity.

As far as applicant knows, a trailer boat hoist of standard design has not been offered. Existing trailer boat hoists have been fabricated at the yard in which it is to be used, and problems common to a device built at a single point and shipped to a remote point have been ignored. A boat hoist must be one that can be shipped from the point of manufacture in knock-down condition and assembled easily at the point of use.

Applicant's first object is to provide a boat hoist of satisfactory strength which lacks a parallelepiped frame. This negative object may be more affirmatively stated by saying that a feature of applicant's invention is the provision of a U-shaped frame supported horizontally on wheels a short distance above the ground on the upper portion of which are erected gantries, from each of which hangs a sling. A gantry is a horizontal framework supported at each end by an upright and is used to span something. The primary forces which the frame of a boat hoist must resist are vertical, and gantries supported by an unusually strong base frame will perform these functions. Importantly, the arms of the U-shaped base frame are held in proper relationship to each other by the gantries, i.e., the gantries replace the upper portions of a parallelepiped frame.

The principal advantage of the gantry derives from applicant's second object which is to make one of the slings movable toward or away from the other sling. This object is desirable because boats are of different lengths, and it is best to position the sling a few feet from the bow or the stern. If the slings are at a fixed distance from each other, it follows that if the slings are close enough together to lift a 15-foot boat properly, then they will be more than 15 feet from the prow and the stern respectively of a 45-foot boat. A feature of applicant's invention is the provision of a fixed tail gantry with a movable forward gantry so that a boat of any length, within the limit for which the gantry is built, can be picked up at points spaced from the bow and the stern which will least injure the boat.

Another object is to provide a boat hoist which can be operated by one man. Commonly, slings are separately raised. If one man seeks to raise a boat, therefore, he must raise one sling a short distance, and the other sling a short distance, and keep alternating until he gets the boat out of the water, that is, if he keeps the boat reasonably level, which he should do. This is slow. There is a temptation to raise one sling until the boat is tilted at a substantial angle, and then raise the other sling until the boat is tilted at a substantial but opposite angle. This is not good for the boat nor for what is in the boat. One of the features of applicant's invention is the provision of a single power source which operates both slings. A feature incidental to this feature is the provision of a telescoping drive shaft for functioning the cable reels for the sling on the movable gantry from the source of power which is mounted on the fixed gantry.

Another object of this invention is to provide a simple lock which fastens the bottom of each upright support of the movable gantry to its associated arm of the U-shaped frame.

Another object of this invention is to eliminate the forward wheels and substitute a coupling for mounting on the fifth wheel of the truck tractor.

As will appear in the disclosure that follows, there are several structural features which provide a simplicity that greatly reduces the cost of the device.

These and such other objects as may hereinafter appear are attained in the embodiments of the invention shown in the accompanying drawings, wherein.

Figure 1:
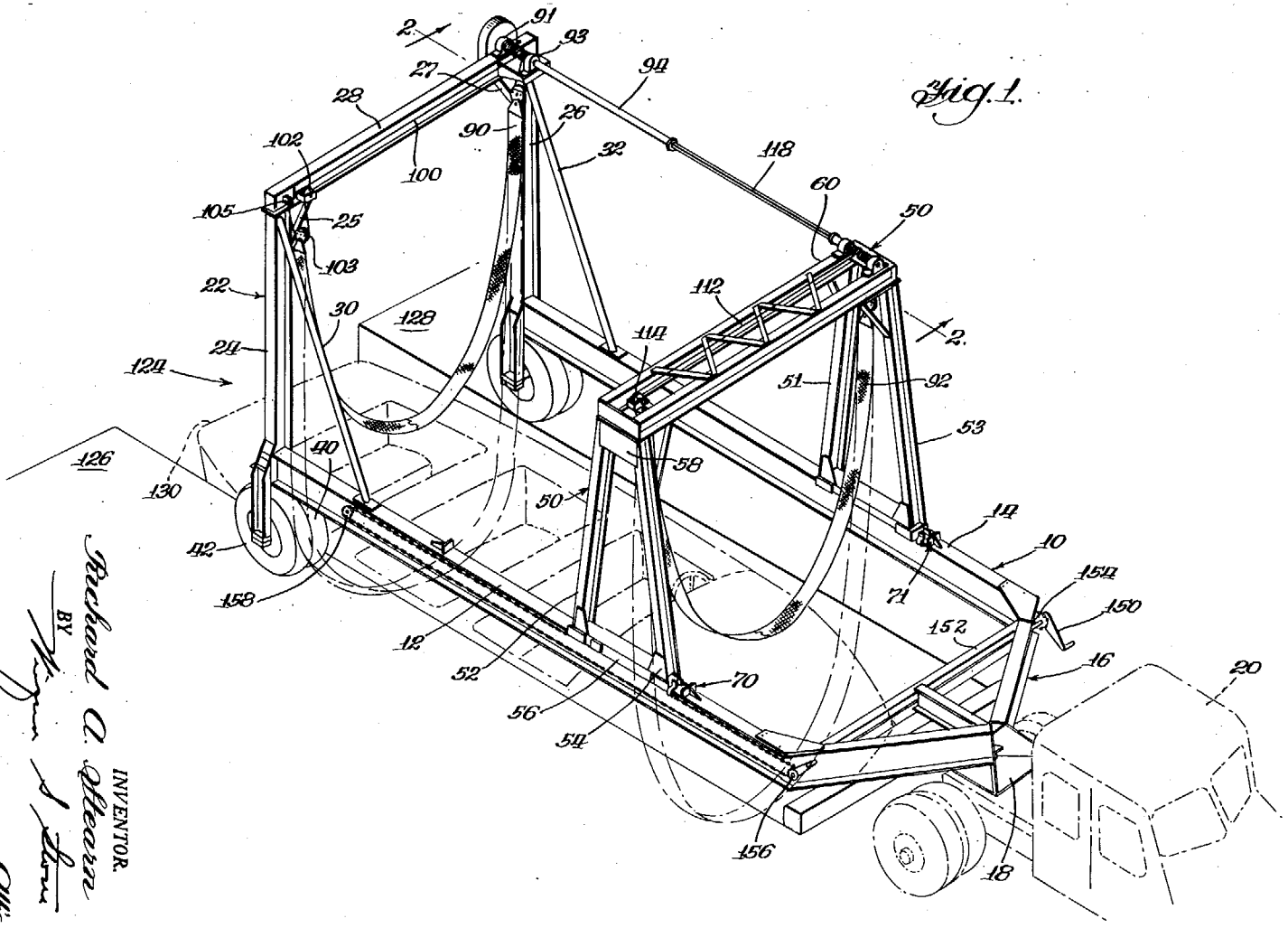
FIGURE 1 is a perspective view of applicant's six-ton gantry hoist positioned over a slip.

Referring to FIGURE 1, applicant illustrates in perspective his boat hoist having a six-tone lifting capacity. This boat hoist concentrates structural strength for towing purposes close to the ground and utilizes gantries to support the slings.

The numeral 10 identifies a generally U-shaped frame consisting of two arms or supporting rails 12 and 14 joined by a base 16 having a platform 18 with a pin for removably mounting the forward end of the frame on the fifth wheel of a truck tractor. This U-frame is made of I-beams.

The rear or tail gantry is generally identified by the numeral 22, and comprises two I-beam uprights 24 and 26 rigidly mounted on the ends of the frame rails 12 and 14 respectively, and rigidly to the opposite ends of a cross member 28. This tail gantry, therefore, is a fixed gantry. To assure vertical positioning longitudinally of the frame 10, two tubular stays 30 and 32 are rigidly fastened between the uprights 24 and 26 and the rails 12 and 14 respectively. To assist right-angle relationship of the gantry members, stays 25 and 27 are provided.

A pair of wheels support each rear corner of the hoist.

Figure 4:
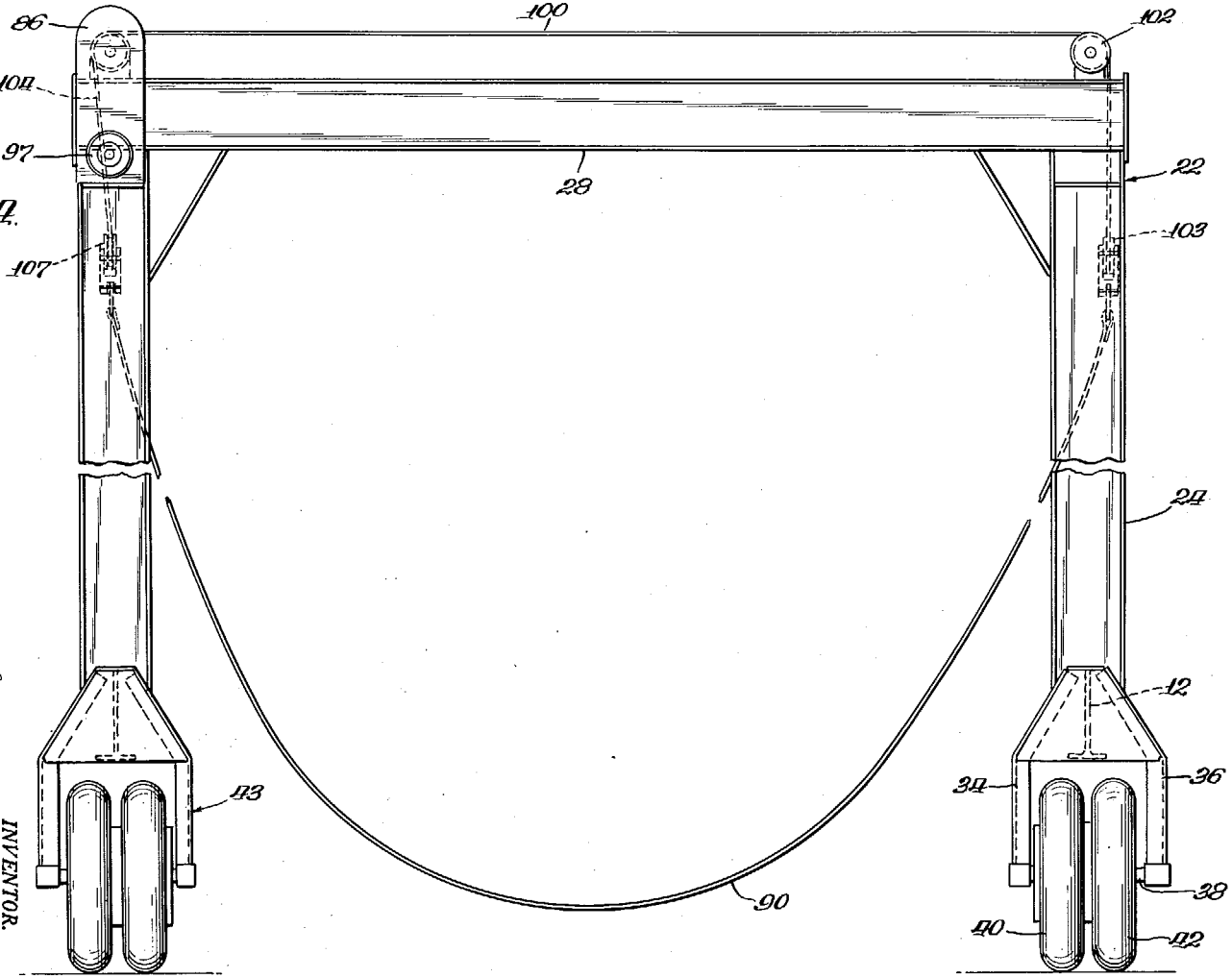
FIGURE 4 is a rear end view of a boat hoist.

Referring to FIGURE 4, two spaced legs 34 and 36 are fastened near the point of juncture to the upright 24 and the horizontal rail 12, and they support between themselves a shaft 38 which carries two wheels 40 and 42. The other wheel structure 43 is identical.

Returning to FIGURE 1, the forward movably gantry is identified by the numeral 50. Each upright of this gantry comprises two upright I-beams 52 and 54 rigidly fastened to a base 56 and to a lintel 58 to provide a trapezoidal side elevation. The upright 51 is joined to a similarly constructed upright 58 by a transverse truss 60, to which they are rigidly fastened.

Figure 5:
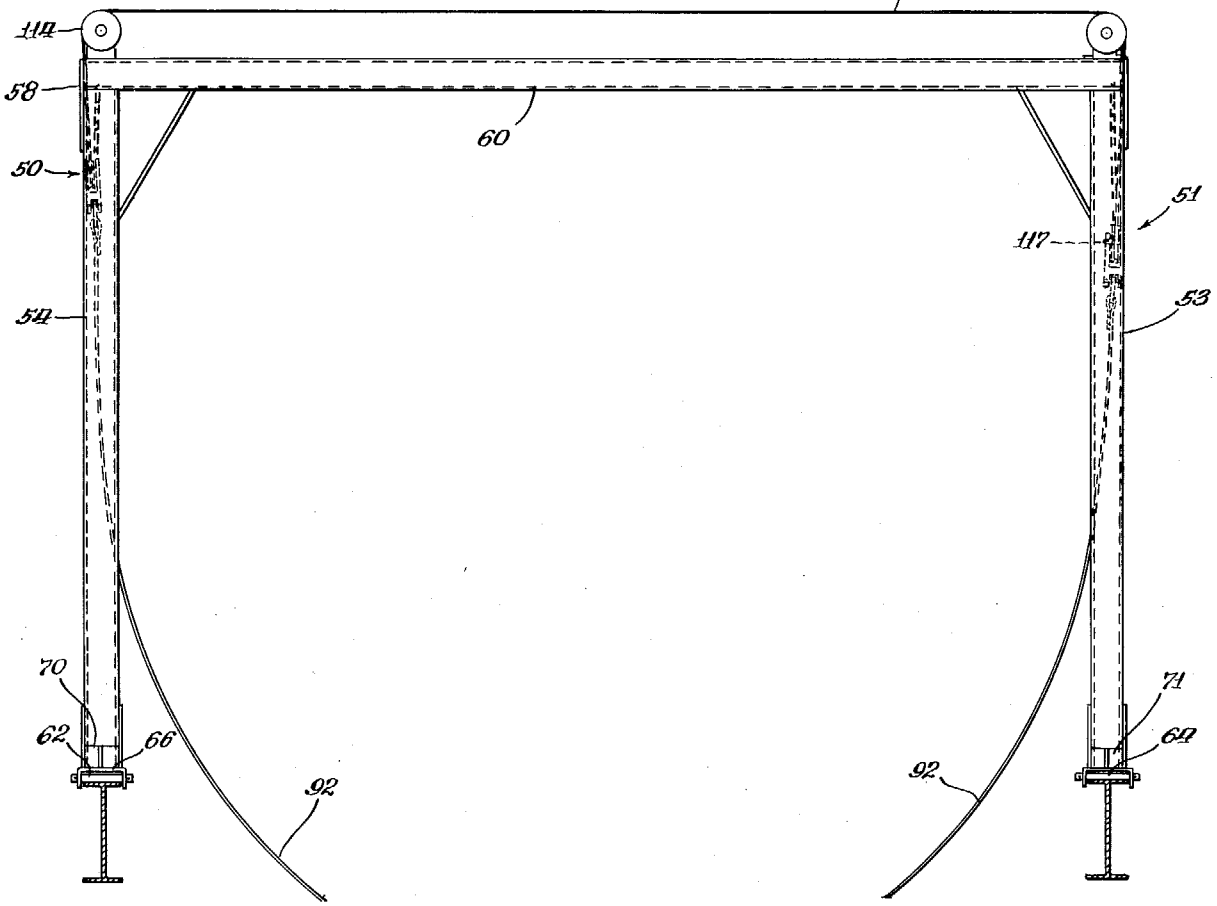
FIGURE 5 is a front elevation of the travel gantry taken on the line 5—5 of FIGURE 2.

This movable gantry 50 is mounted on four rollers, two of which can be seen in FIGURE 5, where they bear the numerals 62 and 64. These rollers may be supported on the base member 56 in any suitable way as by a U-shaped bracket 66. A flange 63, mounted on the side of the base 56, extends under the I-beam 12 and prevents the gantry from derailing.

Figure 6:
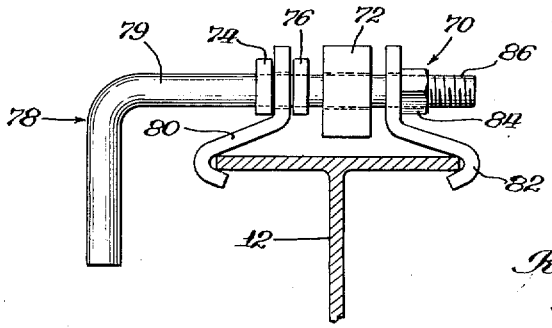
FIGURE 6 is an enlarged view of the clamp 70 taken on the line 5—5 of FIGURE 2; and, FIGURE 7 is a perspective view of applicant's twenty-ton boat hoist.

In order to fix the uprights 51 and 53 of the gantry 50 to the rails 12 and 14 respectively, applicant provides on the forward end of each base member, such as 56, a manually operable clamp 70 which is shown in FIGURE 6. Projecting forwardly from the base 56 is a block 72. Through a hole in the block 72 is positioned a rotatable crank 78. Two clamping jaws 80 and 82 with suitable holes for passing the shank of the crank 78 are positioned as shown and an internally threaded nut 84 is welded to the outside of the jaw 82. The jaw 80 rides loosely on the shaft 79 of the crank 78 but is confined by stops 74 and 76 which are washers tacked by welds to the shaft 79. The end 86 of the shaft 79 is threaded. By rotating the lever 78, the jaw 82 will be drawn toward the jaw 80. Each lower end of the jaws 80 and 82 are flanged about 180° so as to clamp the opposite edges of the upper base of the I-beam or rail 12.

The movable gantry 50 may be moved lengthwise of the rails 12 and 14 by turning a crank 150 which is mounted on the cab driver's side of the boat hoist on a shaft 152 which extends the entire width of the U-shaped frame. Mounted adjacent to the crank 150 on the shaft 152 is a sprocket 154, and at the other end of the shaft is a sprocket 156. Mounted adjacent the outer side of the web of each rail so as to be within the protection of the upper and lower base members of the I-beam is an idler sprocket such as 158. A drive chain 159 is entrained over sprockets 156 and 158. A similar chain is similarly entrained over the sprocket 154 and a rear sprocket on the rail 14 which cannot be seen. The ends of each chain are fastened to the base such as 56 of the uprights 51 and 58 of the gantry 50.

Figure 2:
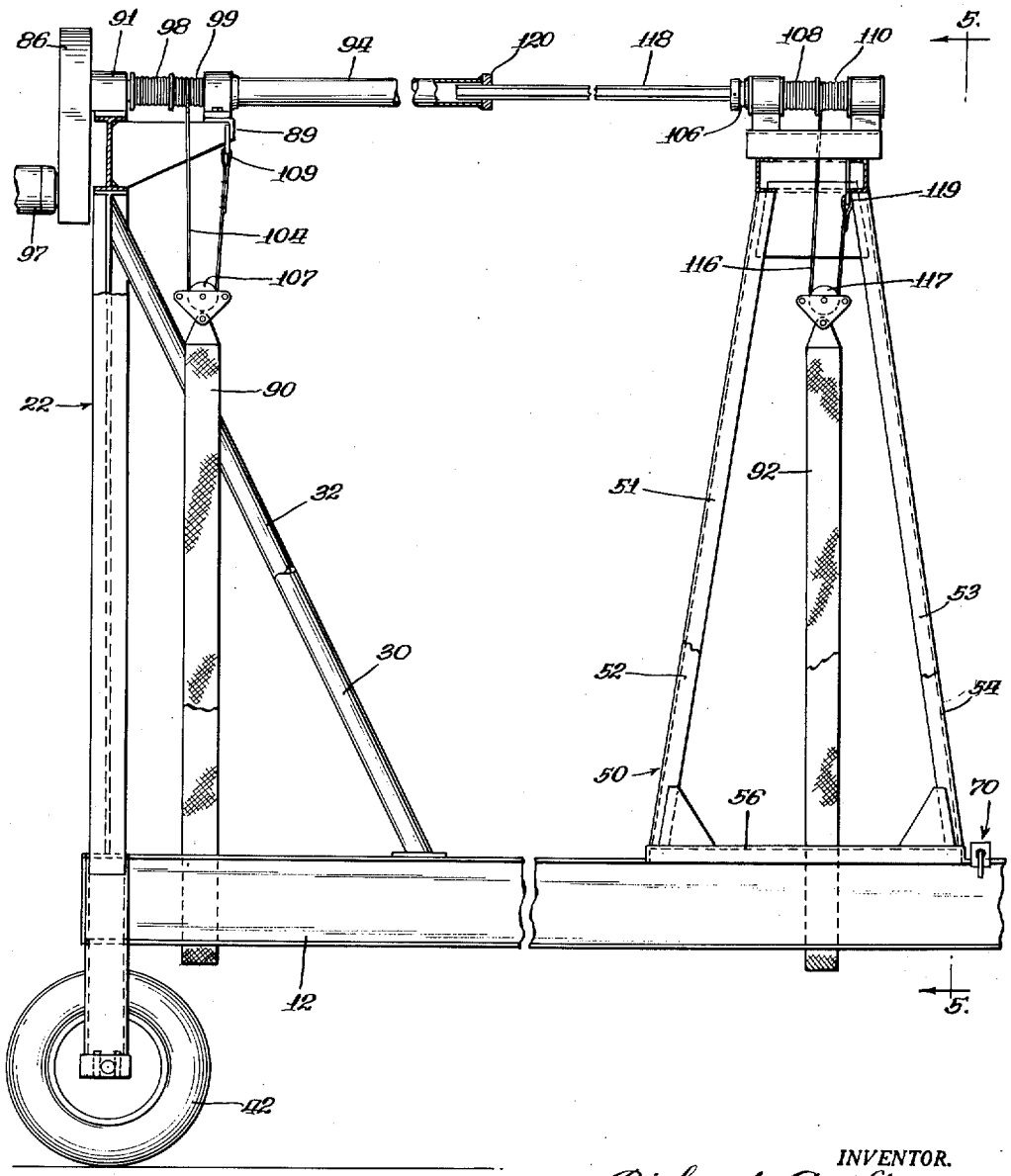
FIGURE 2 is a view taken on the line 2—2 of FIGURE 1.
Figure 3:
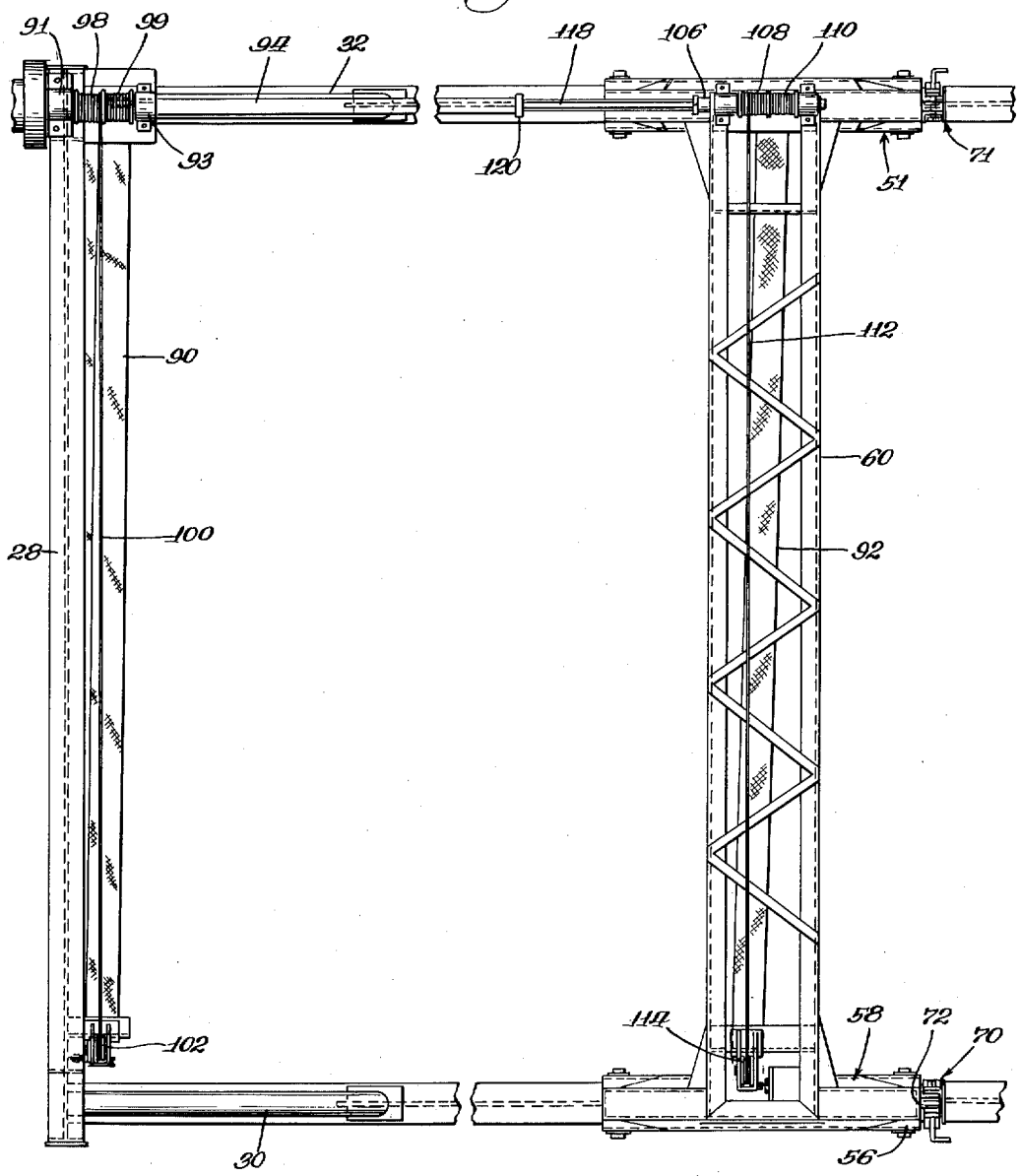
FIGURE 3 is a plan view thereof.

This boat hoist employs two slings, the tail sling 90 and the forward sling 92. Describing first the operating mechanism for the tail sling, there is mounted on the upper left rear corner of the tail gantry an auxiliary platform 89 which with the cross member 28 supports two pillow blocks 91 and 93 axially aligned and parallel to the rail 14. In these is mounted a shaft 94 driven through gears in a gear box 86 by a motor 97. This shaft carries two cable drums 98 and 99, referring to FIGURES 3 and 2, as well as FIGURE 1. One cable designated 100, extends parallel to the transverse member 28 to a sheave 102 from which its lower end passes through a pulley 103 attached to one end of the sling 90, and thence is attached to the upright 24 at 105. The other cable 104 is belayed through a pulley 107 attached to the other end of the sling 90, and thence to the frame 89 at 109. By rotating the shaft 94 in one direction, the sling may be raised from both sides at the same rate of speed, or by rotating it in the other direction, the sling may be lowered. Drive connections including the reversing mechanism need not be detailed here.

The cable-winding mechanism on the movable gantry 50 is quite similar to that on the fixed gantry 22, there being a shaft 106 having two cable drums 108 and 110.

A cable 112 reeled on drum 108 has its free end extending across the truss 60 of the gantry 50 to a sheave 114 from which its lower end depends and is belayed through a pulley, not shown, fastened to the near end of the sling 92, and thence to the near side of the frame. A cable 116 reeled on the other drum 110 has its lower end extending downwardly through a pulley 117 fastened to the other end of the sling 92, and thence to the gantry frame at 119.

An independent motor and drive may be provided for the shaft 106 on the movable gantry, but this requires synchronization in the controls. To avoid this, applicant has aligned the shaft 106 with the shaft 94 and connected them by a telescoping drive consisting of an inside hexagonal drive shaft 118 which telescopes through a drive knuckle 120 mounted on the shaft 94, which is tubular, the drive knuckle having a hex opening so as to establish a driving connection between the tube 122 and the hex shaft 118. By releasing the clamp blocks such as 70 on the uprights 51 and 58 of the movable gantry 50, referring to FIGURE 1, the gantry may be moved closer to or farther away from the tail gantry without impairing the drive connection between the shafts 94 and 106.

Figure 7:
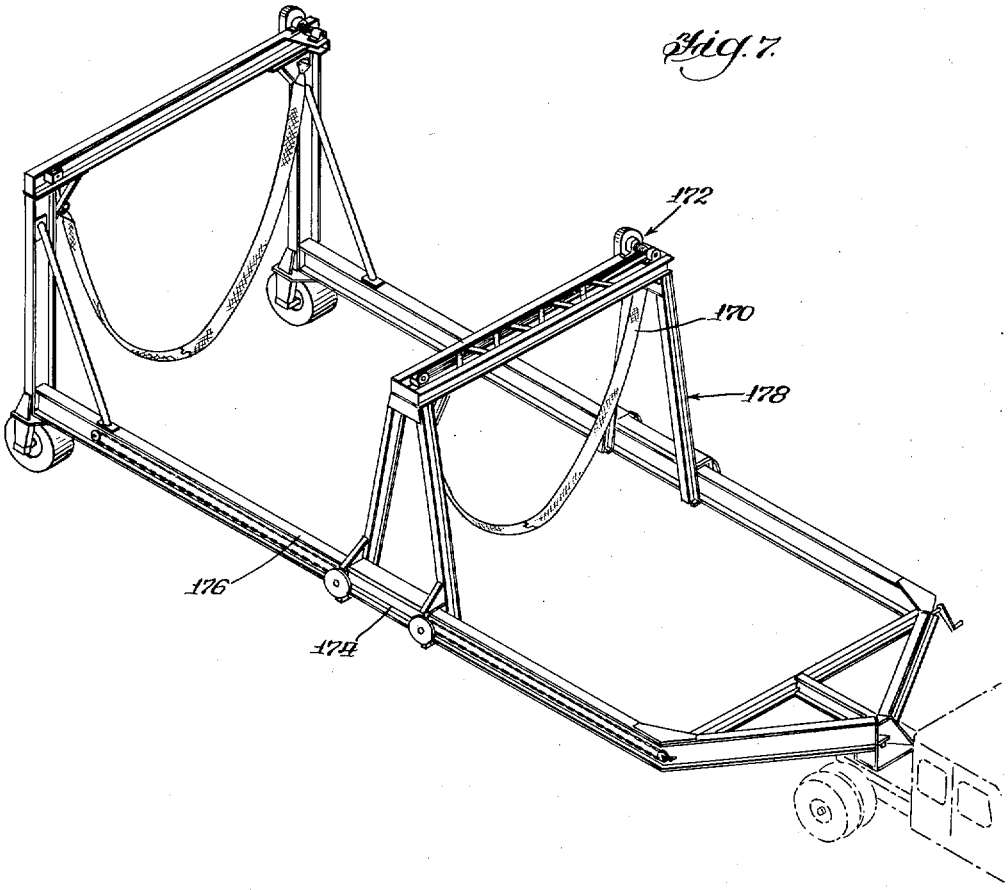

In FIGURE 7, applicant shows a perspective view of a boat hoist having a twenty-ton capacity, that is, three and a third times the capacity of the boat hoist shown in the first six figures. The over-all length of this boat hoist from the forward beam for the fifth wheel of the truck tractor to the rear edge of the rear wheels is a little short of 60 feet. This boat hoist need not be described in detail, but two distinctive features will be pointed out. In this boat hoist, it will be observed that the forward sling 170 is operated by a separate drive assembly 172. Synchronization could be accomplished by a Selsyn system, but it was not felt practical to employ a telescoping driving shaft such as that shown in the first embodiment of the invention so that a single motor on the tail gantry could be used to raise both slings. The distance between the two gantries to too great.

Attention is also invited to the rectangular sleeve base 174 which completely surrounds the I-beam 176. As will be described in detail in copending application Serial No. 578,490 filed April 16, 1956, this sleeve contains clamps which so tighten on the I-beam as to hold the beam by means of the gantry 178 itself from rotational movement. In the first embodiment of the invention, the gantry affords substantially no resistance to a twisting of either one of the longitudinal rails of the U-shaped frame. In the embodiment shown in FIGURE 7, the gantry constitutes the equivalent of a truss between the two rails 176 and 180. The entire structure constitutes what is called in mechanics a bent, and performs the function of supporting the rails laterally and against rotation through the inherent quantities of a bent.

USE

In FIGURE 1, applicant shows a slip such as is found in boat yards. The slip itself is the water channel identified by the numeral 124 and is formed between the two walls or edges of the piers 126 and 128 and a bottom which is below the surface of the water 130. Applicant's boat hoist is backed over the slip with the slings 90 and 92 in the raised, solid-line positions shown in FIGURE 1. One of the features of this boat hoist is that it can be functioned completely by a single man, who in the backing-up process would be in the cab 20. He then moves back to the rear corner 132 of the boat hoist where the motor control is located. He lowers the slings 90 and 92 until their center portions are well below the bottom of the boat which is about to be moved into the slip, the slings being shown in dotted-line positions 134 and 136. He next moves the boat 138 into the slip. The boat shown is a small motorboat. It will be appreciated that a boat with a mast having a height greater than the height of the transverse member 28 cannot be moved into the slip. The model shown in FIGURES 1 through 7, therefore, can only accommodate sailboats whose masts and rigging have been removed or other types of boats whose highest superstructure is lower than the transverse member 28.

If he has not already done so, the operator then moves the gantry 50 forward or rearward while centering the boat between boat slings 90 and 92 by means of the crank 150. When this has been done, he fastens the clamps 70 and 71.

The operator starts the motor, raises the boat by means of the slings 90 and 92 out of the water, and drives the truck tractor and hoist to a position in the yard where the cradle in which the boat is to be kept over the winter is located. He backs the boat over the cradle which ordinarily supports the boat between the slings 90 and 92. Having lowered the boat into the cradle, he can drive forward away from the cradle after he has first manually cleared the sling 90 from under the stern of the boat.

Having thus described his invention, what applicant claims is:

1. A boat hoist comprising a U-shaped frame including two elongated members held in spaced, side-by-side relationship by means connecting one end of one to the corresponding end of the other, means for movably supporting said frame horizontally above the ground, an inverted U-shaped gantry having its legs permanently mounted on the two free ends of the elongated members respectively, a second inverted U-shaped gantry having the ends of its legs resting on the elongated members respectively and movable lengthwise thereof, a sling suspended from each gantry, a pair of spaced sheaves mounted on each elongated member, a flexible elongated member entrained over the sheaves and having its two ends fastened to that leg of the movable gantry associated with said elongated member, a drive shaft connecting two of said sheaves, and a crank for rotating said shaft.

2. A boat hoist comprising a frame including two elongated members held in spaced, side-by-side relationship at one end, means for movably supporting said frame horizontally above the ground, an inverted U-shaped gantry having its legs permanently mounted on the two free ends of the elongated members respectively, a second inverted U-shaped gantry having the ends of its legs resting on the elongated members respectively and movable lengthwise thereof, a sling suspended from each gantry, a power unit mounted on the fixed gantry, a drive means connecting the power unit to means for lowering and raising the slings on both gantries.

3. A boat hoist comprising a frame including two elongated members held in spaced, side-by-side relationship at one end, means for movably supporting said frame horizontally above the ground, an inverted U-shaped gantry having its legs permanently mounted on the two free ends of the elongated members respectively, a second inverted U-shaped gantry having the ends of its legs resting on the elongated members respectively and movable lengthwise thereof, a sling suspended from each gantry, a cable drum mounted on each gantry, the axes of the drums being in alignment, a cable entrained over each drum and connected to the sling associated with the respective gantry for raising and lowering the same, and two telescoping shafts drivingly connected to each other and respectively connected to the drums, and means for rotating one of the drums.

*4. A boat hoist comprising a frame including two elongated members in spaced, side-by-side relationship, means for movably supporting said frame horizontally above the ground, an inverted U-shaped gantry having its legs permanently mounted on the two free ends of the elongated members respectively, a second inverted U-shaped gantry having the ends of its legs resting on the elongated members respectively and movable lengthwise thereof, a sling suspended from each gantry, a power unit mounted on the fixed gantry, a drive means connecting the power unit to means for lowering and raising the slings on both gantries.*

*5. A boat hoist comprising a frame including two elongated members in spaced, side-by-side relationship, means for movably supporting said frame horizontally above the ground, an inverted U-shaped gantry having its legs permanently mounted on the two free ends of the elongated members respectively, a second inverted U-shaped gantry having the ends of its legs resting on the elongated members respectively and movable lengthwise thereof, a sling suspended from each gantry, a cable drum mounted on each gantry, the axes of the drums being in alignment, a cable entrained over each drum and connected to the sling associated with the respective gantry for raising and lowering the same, and two telescoping shafts drivingly connected to each other and respectively connected to the drums, and means for rotating one of the drums.*

References Cited in the file of this patent or the original patent

UNITED STATES PATENTS

| | | |
|---|---|---|
| 505,638 | Rasch | Sept. 26, 1893 |
| 684,965 | Weimar | Oct. 22, 1901 |
| 890,151 | Marshall | June 9, 1908 |
| 1,671,252 | Moore | May 29, 1928 |
| 2,424,899 | Priester | July 29, 1947 |
| 2,494,509 | Gruska | Jan. 10, 1950 |
| 2,509,067 | Leach | May 23, 1950 |
| 2,636,745 | Cartwright | Apr. 28, 1953 |

FOREIGN PATENTS

| | | |
|---|---|---|
| 470,114 | Great Britain | Aug. 10, 1937 |